US012710958B2

(12) United States Patent
Hess et al.

(10) Patent No.: US 12,710,958 B2
(45) Date of Patent: Aug. 18, 2026

(54) METHOD FOR CHECKING A PROCESSING OF PAYLOAD DATA

(71) Applicant: Robert Bosch GmbH, Stuttgart (DE)

(72) Inventors: Felix Hess, Benningen (DE); Peter Schneider, Holzgerlingen (DE); Sascha Guebner, Bodenburg (DE); Vera Schumacher, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 253 days.

(21) Appl. No.: 18/582,619

(22) Filed: Feb. 20, 2024

(65) Prior Publication Data

US 2024/0311143 A1 Sep. 19, 2024

(30) Foreign Application Priority Data

Mar. 13, 2023 (DE) ..................... 10 2023 202 225.7

(51) Int. Cl.
*G06F 9/44* (2018.01)
*G06F 8/71* (2018.01)

(52) U.S. Cl.
CPC ..................................... *G06F 8/71* (2013.01)

(58) Field of Classification Search
CPC ........................................................ G06F 8/71
See application file for complete search history.

(56) References Cited

U.S. PATENT DOCUMENTS

2005/0080743 A1* 4/2005 Ostrover ................. G06F 21/10 705/50
2011/0078377 A1* 3/2011 Grube ................. G06F 11/1076 709/219

OTHER PUBLICATIONS

Stigge et al., "Reversing CRC—Theory and Practice," HU Berlin Public Report SAR-PR-2006-05, 2006, pp. 1-24. <https://sar.informatik.hu-berlin.de/research/publications/SAR-PR-2006-05/SAR-PR-2006-05_.pdf> Downloaded Feb. 13, 2024.

* cited by examiner

*Primary Examiner* — Qamrun Nahar
(74) *Attorney, Agent, or Firm* — NORTON ROSE FULBRIGHT US LLP

(57) ABSTRACT

A method for checking a processing of payload data. The method includes processing the payload data and metadata by a sequence of data processing blocks. An adjustment value is ascertained for each data processing block as a function of a thereto-supplied payload data version so that, if the thereto-supplied metadata version is correctly processed by the data processing block to form a respective processing result, the processing result, after having been adjusted according to the adjustment value according to a specified adjustment rule, is equal to a value assigned to the data processing block. Each data processing block processes the metadata version supplied to it, and the next metadata version is derived from the supplied metadata version as a function of the processing result adjusted according to the adjustment value according to the specified adjustment rule, and checking whether the payload data have been processed correctly.

8 Claims, 4 Drawing Sheets

101
102
103
104
105
processor
memory
control program
106
107
control program
server(s)

300
data source
301
(MD0, ND0)
302
PK1
(MD1, ND1)
303
PK2
(MD2, ND2)
...
(MDn-1, NDn-1)
304
PKn
(MDn, NDn)
MDn =
F(PKn, F(PKn-1, F(...,F(PK1, MD0))))
305

METHOD FOR CHECKING A PROCESSING OF PAYLOAD DATA

CROSS REFERENCE

The present application claims the benefit under 35 U.S.C. § 119 of German Patent Application No. DE 10 2023 202 225.7 filed on Mar. 13, 2023, which is expressly incorporated herein by reference in its entirety.

FIELD

The present invention relates to methods for checking a processing of payload data.

BACKGROUND INFORMATION

Today, safety-critical applications are usually executed on specific hardware developed for this purpose. The safety requirements of the application usually result in hardware requirements in terms of error-proneness and error rates that often cannot be guaranteed by non-safety-critical, commercially widespread hardware, for example processors or working memories. However, efforts are currently being made to nevertheless execute safety-critical applications on non-safety-critical hardware since the latter is often significantly more inexpensive and more powerful. In order to make this possible, particular features of the safety-critical hardware, such as a lock-step mode or the like, are emulated by software.

For example, a safety-critical calculation may be performed on several independent non-safety-critical systems and its results can then be compared in order to detect possible errors. The data paths in such systems are naturally more complex, and adherence thereto must be ensured by the entire system. Thus, correct adherence to the processing path (by means of so-called program flow controls) must be ensured via several processing modules of a safety-critical application if, for example, data must be preprocessed before the actual analysis in order to ensure the correct execution of the application.

Effective approaches for monitoring data processing are therefore desirable, in particular with regard to the program flow, in particular for distributed data processing systems that can be reconfigured dynamically at runtime.

The paper “Reversing CRC-Theory and Practice” by Martin Stigge et al., HU Berlin Public Report SAR-PR-2006-05, May 24, 2006, describes how to find bits that must be appended to input data for a CRC (cyclic redundancy check) so that a desired CRC result is obtained.

SUMMARY

According to various example embodiments of the present invention, a method for checking a processing of payload data is provided, the method comprising processing the payload data together with metadata by means of a sequence of data processing blocks so that the payload data are processed from an initial version of the payload data to a final version of the payload data, and the metadata are processed from an initial version of the metadata to a final version of the metadata, wherein, for each data processing block, an adjustment value is ascertained as a function of a thereto-supplied payload data version so that, if the thereto-supplied metadata version is correctly processed by the data processing block to form a respective processing result, the processing result, after having been adjusted according to the adjustment value according to a specified adjustment rule, is equal to a value assigned to the data processing block, and each data processing block processes the metadata version supplied to it, and the next metadata version is derived from the thereto-supplied metadata version as a function of the processing result thereof adjusted according to the adjustment value according to the specified adjustment rule. The method furthermore comprises checking whether the payload data have been processed correctly by checking whether the final version of the metadata matches a reference final version of the metadata.

The method according to the present invention described above makes it possible to check (in a data sink) the program flow run through during a processing of payload data, wherein the communication overhead and the complexity of the error detection logic (e.g., in the data sink) can be kept low.

The adjustment value can also have a value, e.g., zero, that indicates that the processing result does not have to be adjusted. The adjustment rule for such a value then includes that the processing result is not changed. According to the adjustment rule, it is, for example, ascertained whether the processing result must be adjusted and, if so, it is changed accordingly.

In one example embodiment of the present invention, the reference final version depends on the respective metadata (i.e., a respective “challenge”). Different challenges can be used for a plurality of checks.

Various exemplary embodiments are specified below.

Exemplary Embodiment 1 is a method for checking a processing of payload data as described above.

Exemplary Embodiment 2 is a method according to Exemplary Embodiment 1, wherein, for each data processing block, the next metadata version is derived from the thereto-supplied metadata version by applying a function to the thereto-supplied metadata version and the processing result thereof after it has been adjusted with the adjustment value according to the specified adjustment rule.

The adjusted processing result thus clearly serves for each data processing block as a parameter of the function (e.g., hash function) that is applied to the metadata. If the data processing block incorrectly processes the metadata, this error (if the function is selected appropriately) is reflected in the function value and can be detected.

Exemplary Embodiment 3 is a method according to Exemplary Embodiment 2, wherein the function is a cyclic redundancy check function.

This function makes efficient calculation possible and ensures that an incorrect processing result is reflected in the function value (and also in the final version of the metadata).

Exemplary Embodiment 4 is a method according to one of Exemplary Embodiments 1 to 3, wherein each data processing block processes the metadata version supplied to it, as a function of checkpoints that are run through during the processing of payload data, and the adjustment value is ascertained by ascertaining which and/or what number of checkpoints is run through during the processing of payload data.

In this way, several valid paths through the data processing block (or through the program of the data processing block) can be realized without the need to provide different reference final versions of the metadata for different paths. This significantly reduces the complexity since the number of reference final versions of the metadata to which the final version of the metadata must be compared can in particular also be kept low.

Exemplary Embodiment 5 is a method according to Exemplary Embodiment 4, wherein the metadata version supplied to the data processing block is iteratively processed by the data processing block in that it is processed for each checkpoint that is run through, according to a metadata processing value assigned to the checkpoint.

In order for different branches to lead to the same processing result, dummy checkpoints can be inserted in a path so that the number of checkpoints in all paths matches.

Exemplary Embodiment 6 is a method according to Exemplary Embodiment 5, wherein the metadata version supplied to the data processing block is iteratively processed by the data processing block in that it is processed for each checkpoint that is run through, by applying a CRC function which receives, as input, the metadata processing value assigned to the data processing block.

Both in the outer processing chain (across the data processing blocks) and within the data processing blocks, a CRC function can thus be used so that efficient calculation (processing of the metadata) can take place at both levels and it is ensured that errors in the program flow are ultimately reflected in the final version of the metadata.

Exemplary Embodiment 7 is a method according to one of Exemplary Embodiments 1 to 6, wherein the adjustment rule includes that the processing result is adjusted as a function of a difference of the initial version of the metadata to a reference initial version of the metadata.

Per data processing block, it is thus possible to compensate not only the differences in the processing result that result from different runs through the data processing block but also differences in the processing result that result from a change in the initial version of the metadata (i.e., the "challenge"). As a result, the complexity can be kept low even if different challenges are used. This compensation can also be efficiently realized by using a CRC function.

Exemplary Embodiment 8 is a data processing arrangement configured to carry out a method according to one of Exemplary Embodiments 1 to 7.

Exemplary Embodiment 9 is a data processing apparatus configured to ascertain an adjustment value as a function of a payload data version supplied to it (in particular, for example, as a function of the size thereof), so that, if the metadata version supplied to it is processed correctly by the data processing apparatus to form a respective processing result, the processing result, after having been adjusted according to the adjustment value according to a specified adjustment rule, is equal to a value assigned to the data processing apparatus; and to process the metadata version supplied to it, and to derive a next metadata version from the metadata version supplied to is, as a function of its processing result adjusted according to the adjustment value according to the specified adjustment rule.

According to various embodiments, one or more such data processing apparatuses are provided for the method according to one of the above exemplary embodiments.

Exemplary Embodiment 10 is a computer program comprising instructions that, when executed by a processor, cause the processor to carry out a method according to one of Exemplary Embodiments 1 to 7.

Exemplary Embodiment 11 is a computer-readable medium storing instructions that, when executed by a processor, cause the processor to carry out a method according to one of Exemplary Embodiments 1 to 7.

In the figures, similar reference signs generally refer to the same parts throughout the various views. The figures are not necessarily to scale, wherein emphasis is instead generally placed on representing the principles of the present invention. In the following description, various aspects are described with reference to the figures.

DETAILED DESCRIPTION OF EXAMPLE EMBODIMENTS

The following detailed description relates to the figures, which show, for clarification, specific details and aspects of this disclosure in which the present invention may be implemented. Other aspects can be used, and structural, logical, and electrical changes can be carried out without departing from the scope of protection of the present invention. The various aspects of this disclosure are not necessarily mutually exclusive since some aspects of this disclosure can be combined with one or more other aspects of this disclosure to form new aspects.

Various examples are described in more detail below.

Figure 1:
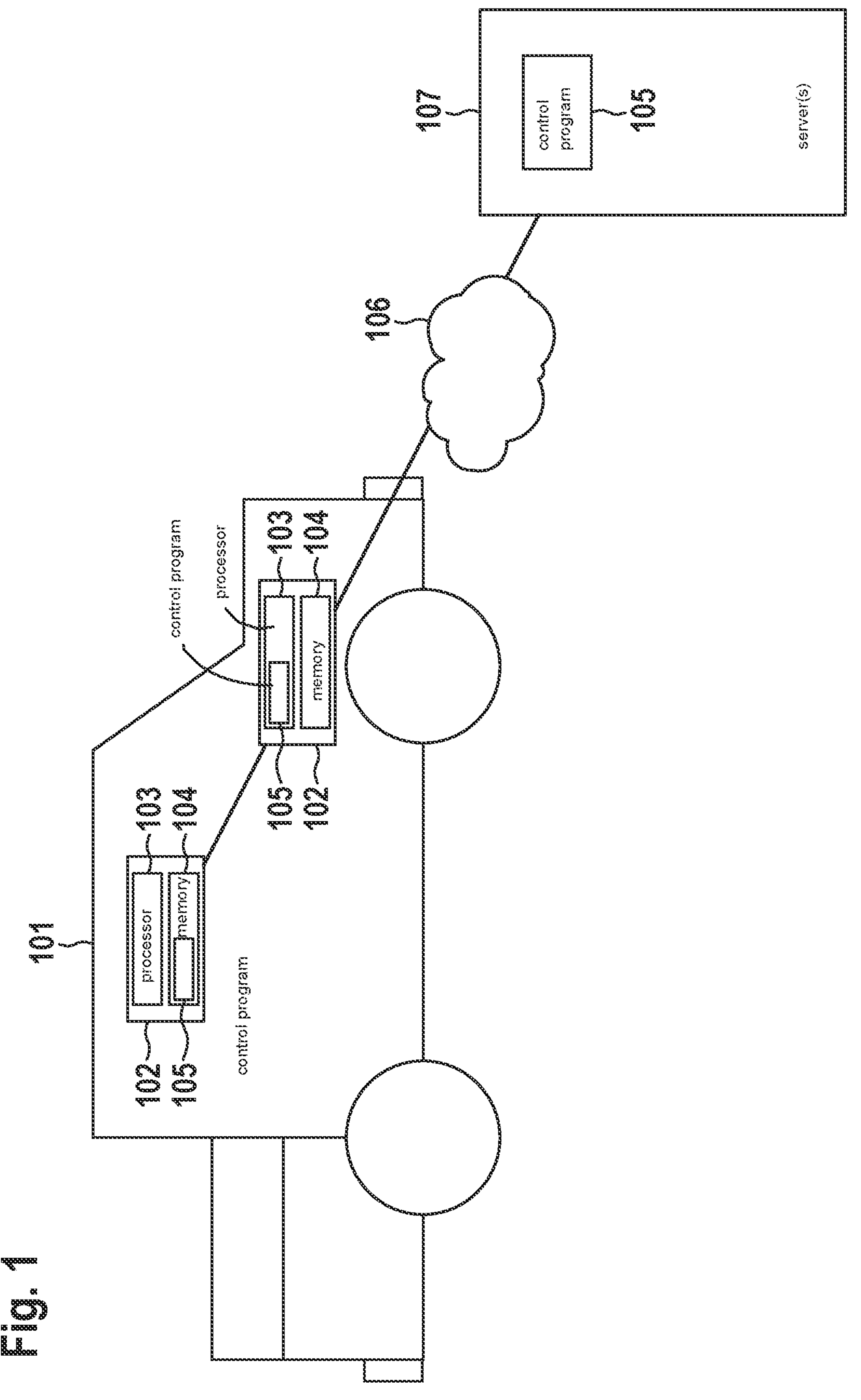
FIG. 1 shows a vehicle with several control devices as an example of a distributed data processing system, according to an example embodiment of the present invention.

FIG. 1 shows a vehicle 101 with several control devices 102 as an example of a distributed data processing system.

The control devices 102 are, for example, electronic control units (ECUs) 102, which respectively carry out a processing and which are connected to one another and exchange data.

Each vehicle control device 102 comprises data processing components, e.g., a processor (e.g., a CPU (central processing unit)) 103 and a memory 104 for storing a respective control program 105 according to which the vehicle control device 102 operates, and data processed by the processor 103.

For example, for each vehicle control device, the stored control program 105 (computer program) comprises instructions that, when the respective processor 103 executes them, cause the vehicle control devices 102 to together perform driver assistance functions or even autonomously control the vehicle 101.

The distribution of tasks can also extend further than within the vehicle 101. For example, via a network 106, a data processing task may also be given to one or more servers 107 (e.g., in a cloud), which also executes a respective control program 105 (e.g., part of an overall program for the respective application) so that the distributed data processing system that performs a respective application (such as the control of the vehicle 101 here) comprises not only the control devices 102 but also the one or more servers 107. In this case, tasks can also be distributed dynamically (in particular outsourced to the server 107) so that a dynamic distributed system is present.

In order to detect errors in the program flow or program execution (i.e., of the control programs 105 in the example above) for an application, a so-called program flow analysis (control flow analysis), which is to ensure the correctness of the program flow with respect to orders and/or time behavior, is typically performed at the development time for application with stricter safety requirements (such as software for vehicle control). Automotive safety standard ISO26262-6:2018 requires such analyses, which typically relate to the compiled software of a single controller. For checking the program flow at runtime, specific hardware units (e.g., watchdog timers or ASICs) are typically used, by means of which deviations from the expected program flow are detected and are safely intercepted, for example by a controller reset or an interruption of the communication interfaces.

For distributed and asynchronous applications or for applications that are executed on non-exclusively used hardware units, the program flow control methods described above are however not readily suitable since the program flow can vary greatly over time due to fluctuating transmission and execution times (without the execution necessarily becoming incorrect as a result) and the resulting signatures for monitoring the correct sequence order are generally not yet known at the development and compilation time of a single element in a dynamic distributed system. The application-related control flow first results at runtime through the dynamic integration of individual elements into a distributed application, and the associated program flow monitoring must therefore also be flexibly configurable at runtime.

According to various embodiments, the program execution is verified or checked (in particular with regard to its program flow) in that, in a distributed data processing system (i.e., a distributed execution of the respective program), additional metadata are assigned to the data that are to be processed, which additional metadata are modified (processed) and passed along on the way through the distributed data processing system (i.e., through the distributed data pipeline that is formed by the data processing system for the data) by the processing processing units (modules, controller, program modules) by means of a specific method such that defects (in particular of the program flow) become visible in the metadata. On the basis of the processed metadata, the respective data sink can check whether all necessary processing steps have been carried out in the correct number and order.

Figure 2:
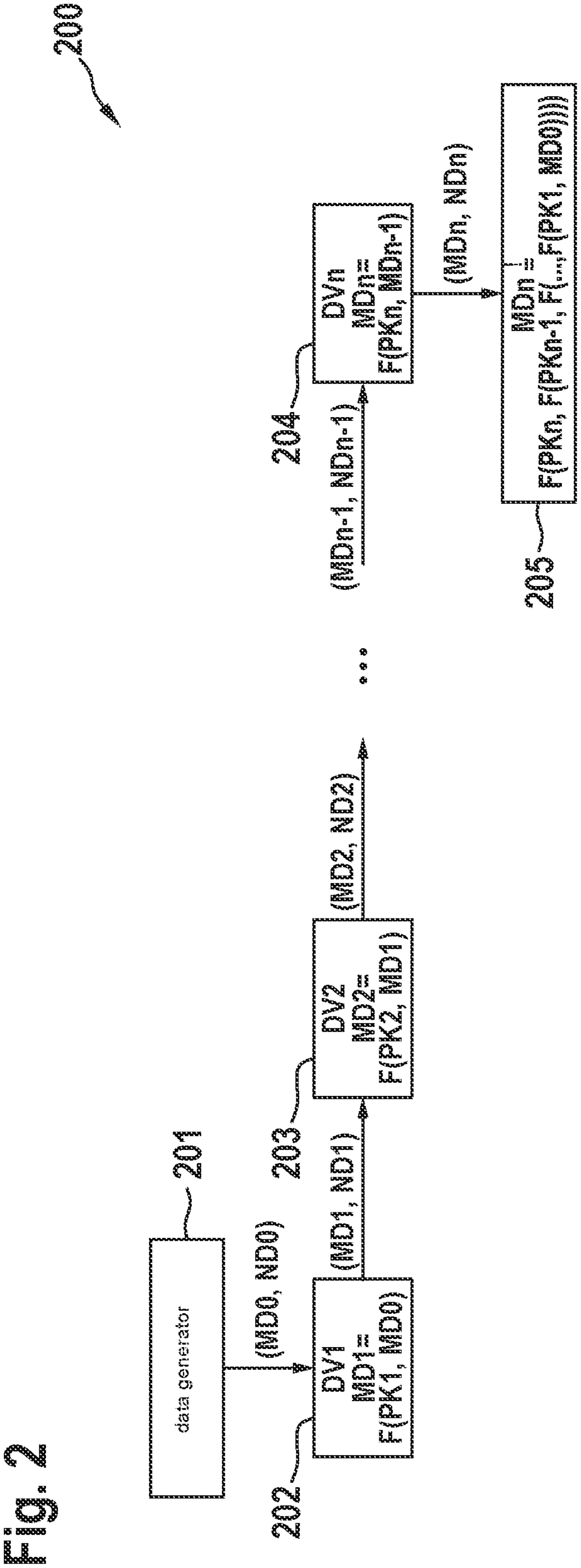
FIG. 2 illustrates a data processing pipeline, according to an example embodiment of the present invention.

FIG. 2 illustrates a data processing pipeline 200 with a data generator 201 (data source) for data to be processed (such as a LiDAR sensor in the vehicle 101 that provides LiDAR data), several processing blocks (also referred to hereinafter as processing units), 202, 203, 204, e.g., ECUs, and a data sink 205.

According to various embodiments, the (payload) data ND0 to be processed are supplemented by the data generator 201 (e.g., an output interface of a sensor device) with random metadata (e.g., a random metadatum in the form of a (key) value MD0). The processing unit (e.g., a respective module that, for example, carries out a preprocessing of the sensor data) following the data processing pipeline 200 applies a function (F) to the original metadatum MD0 using a personal key (PK1) (i.e., a key assigned to this processing unit). The result of applying the function to MD0, which result is referred to as MD1, is passed together with the payload data (ND) processed by the first processing unit 202, to the next processing unit 203, which then again applies the function F to the metadatum MD1 using its personal key (PK2), and so forth.

The data sink 205 ultimately contains a processed version of the original metadatum MD0, which processed version is equal to $$MDn'=F(PKn,F(PKn-1,F(\ldots,F(PK1,MD0))))$$

(with n processing units) if each processing unit 202, 203, 204 has correctly processed the metadatum version it received. This expected (reference) value MDn' is known to the data sink 205 so that said data sink can check, by comparing this value to the metadatum version that said data sink received and that was processed by the processing units 202, 203, 204, whether all processing units 202, 203, 204 have processed the metadatum (and thus also the payload data) in the correct order. If the value MDn' does not match the metadatum version that said data sink received and that was processed by the processing units 202, 203, 204, said data sink initiates a corresponding safety measure (e.g., reset, no use of the payload data processing result, etc.).

For example, the data sink 205 can ascertain the value MDn' from the knowledge of the original metadatum MD0, the personal keys PKi of the processing units 202, 203, 204, and the correct calculation order.

At least the endpoint of the processing chain, i.e., the data sink 205, e.g., an actuator control device in a vehicle, is, for example, located on an independent (safe) device (e.g., a separate control device 102) in order to be able to independently check the preceding processing chain (formed by the processing units 202, 203, 204).

The procedure described above can be used to check the correct and complete calculation sequence of a plurality of calculation modules and/or to check the correct sequence of the calculations within one calculation module. For example, checkpoints can be provided in the code (wherein a supplied metadatum is (further) processed at each checkpoint) and, at the end of the processing by a module, it is checked whether all checkpoints have been run through in a permitted order. Only then is the processing by the module regarded as correct. Checking within modules makes a fine-grained check of the program flow possible.

However, if the checking procedure described with reference to FIG. 2 is applied directly in such a manner, a separate processing block 202, 203, 204 is then provided for each program section (from checkpoint to checkpoint) (because each program section, i.e., each checkpoint, further processes a supplied metadatum like the processing blocks in FIG. 2 do with function F).

However, this scales poorly with the size of the overall processing, i.e., the overall code length, in particular if several paths through the code are basically permitted (i.e., are to be regarded as correct processing), i.e., the distributed program flow checking approach described with reference to FIG. 2 does not scale well for safeguarding the program flow at the source code level if the program flow in the source code has a certain (permitted) variability.

For example, in order to achieve sufficiently high diagnostic coverage of the entire application program flow monitoring, the program flow within a microservice (among several microservices, which together form a (distributed) application (or application software)) must also be monitored with a certain granularity. This can be achieved by introducing additional program flow control points (checkpoints) as described above at the source code level (so that, as explained above, each checkpoint corresponds to a processing block 202, 203, 204 in the checking procedure of FIG. 2). However, the approach of FIG. 2 does not scale well for several hundreds or even thousands of variably handed over code checkpoints in a single microservice (or brick), for a possible combination of hundreds of microservices (or bricks) that together form the distributed application. Examples of program flow elements that result in a desired (i.e., error-free) variability in the run-through code checkpoints at runtime are:

input-data-dependent data processing loops (e.g., 3 vs. 30 iterations)

if-else branches as a function of input data or internal states (i.e., input data history)

The combinational complexity due to the number of up to M different checkpoints in N modules and the resulting large number of different valid results (in the worst case M to the power of N) at the end of such a processing sequence of run-through modules becomes quickly unmanageable in practice. The data sink 205 would have to check many millions of possible correct execution paths and possibly calculate the correct signature (i.e., the respective reference value MDn') for each of them. A simple check as to whether the internal program flow within a microservice (or brick) was correct locally (i.e., on the respective executing node) is also not possible since it must generally be assumed that the execution of such a local check itself could be incorrect (due to potentially unsafe compute nodes that execute one or even more microservices or bricks in the data processing chain). In the worst case, the local check could have a latent error and always signal a correct program flow on the node, whereby the presence of program flow errors is concealed and the safety monitoring mechanism would become ineffective.

A variant of the approach of FIG. 2 that enables better scalability is therefore described below. This is achieved through program flow monitoring 1) within individual application components (e.g., microservices or bricks), for example at the software source code level; such monitoring within an application component is also hereinafter referred to as an "inner chain" check; and 2) across connected application components (i.e., at a logical level between, for example, microservices or bricks); this monitoring across application components is also referred to as an "outer chain" check.

Figure 3:
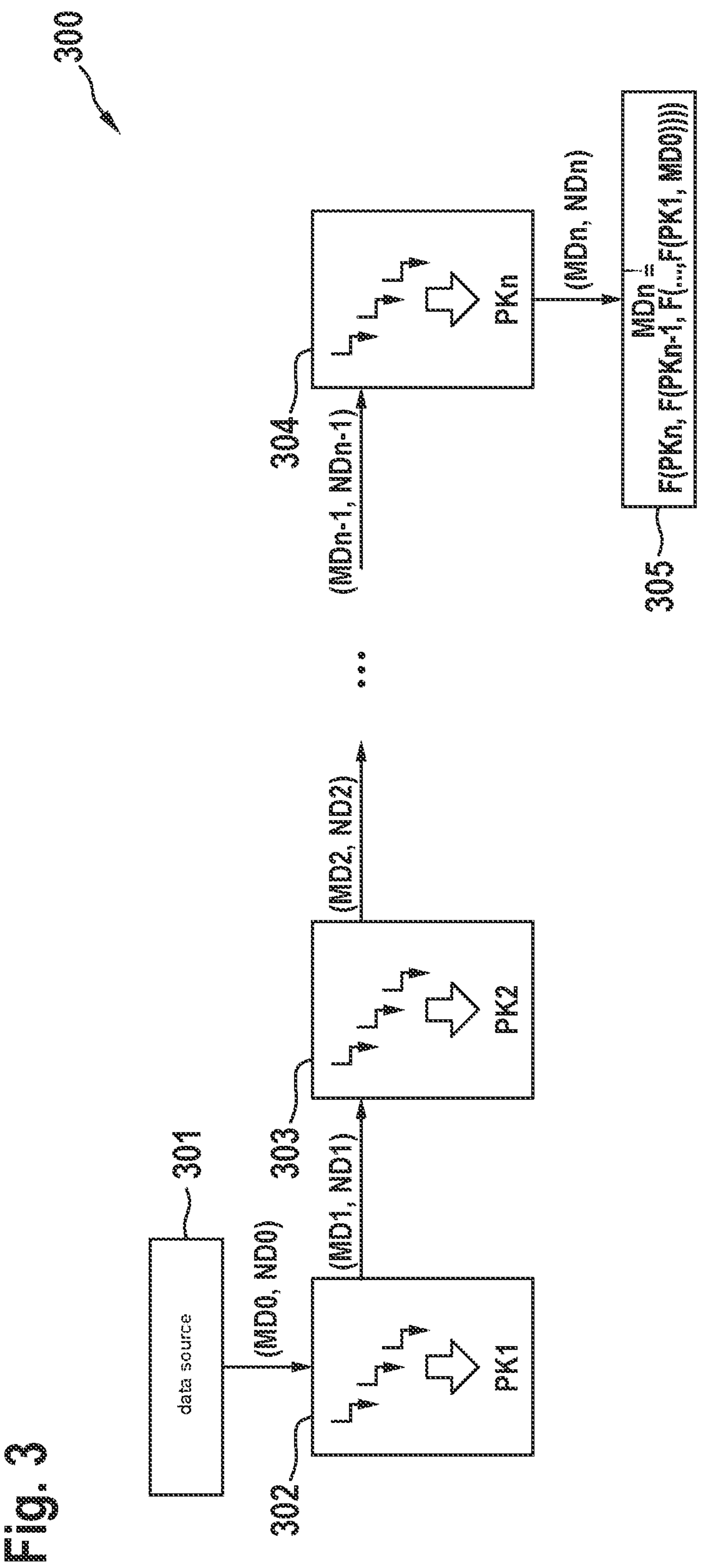
FIG. 3 illustrates program flow monitoring with an outer chain check and an inner chain check, according to an example embodiment of the present invention.

FIG. 3 illustrates program flow monitoring with an outer chain check and an inner chain check.

Like in FIG. 2, there is a data source 301 and a processing chain with processing units 302, 303, 304 and a data sink 305.

The program flow monitoring described with reference to FIG. 2 corresponds to the outer chain check, i.e., the program flow monitoring across the processing units 302, 303, 304. However, each processing unit now corresponds to an application component (i.e., for example, a subprogram, such as a brick or microservice), for which an inner chain check is carried out (in each case, i.e., for each processing unit 302, 303, 304).

As in the program flow monitoring described with reference to FIG. 2, there is an initial version of metadata MD0, which can also be considered a "challenge" (e.g., challenge key) and which is processed by the processing chain. The data sink 305 checks whether the result of the processing, i.e., the "response" (response key or signature), is correct, i.e., matches a reference result. The initial version of the metadata (i.e., the "challenge") can also be sent by the data sink 305 itself to the first processing unit 302 of the processing chain (or also to the data source 301 for passing to the first processing unit 302).

The program flow monitoring approach illustrated in FIG. 3 and explained in more detail below makes it possible to detect latent errors (i.e., the case that a processing unit does not perform its respective inner chain metadata processing or check, where applicable) and program flow errors with a single challenge response pair. This makes possible the assessment of the correctness of the run-through program flow (run through on the processing chain) in the data sink 305, while the communication overhead and complexity of the error detection logic on the data sink 305 can be kept low.

As mentioned above, a two-stage program flow check (outer chain and inner chain) is used for this purpose. The first level (inner chain) is the program flow check within a processing unit (i.e., application component), e.g., a brick or microservice at the source code level. If this check fails, the second level (outer track) also becomes invalid, namely, the distributed flow check at the level of the processing units 302, 303, 304 (i.e., across the processing units 302, 303, 304). This makes a scalable version of the distributed program flow check (DPFC) possible.

In other words, two metadata (e.g., key) transformation mechanisms are coupled with one another:

the inner chain check, which carries out the internal program flow check of the application components per application component (e.g., by means of checkpoints at the program code level)

the outer chain check, which validates the program flow at the level of the application components (i.e., across the processing units 302, 303, 304)

As explained with reference to FIG. 2, in the program flow monitoring across processing units 202, 203, 204 for the i-th processing unit 202, 203, 204, the respective version of the metadata (Mdi-1) is processed as a function of a (personal) key Pki of the i-th processing unit 202, 203, 204 according to a function F, e.g., a hash function.

This now also takes place in the program flow monitoring according to FIG. 3 for the outer chain check, wherein, however, the key Pki is provided as the result of the metadata processing of Mdi-1 by the i-th processing unit 302, 303, 304. In other words, a key obtained from the inner chain metadata processing of each processing unit 302, 303, 304 serves as the personal key (Pki) of the processing unit 302, 303, 304 for the outer chain metadata processing.

Thus, if the checking of the program flow in the inner chain, i.e., for example, at the source code level, fails for some reason, the inner chain generates an incorrect key. However, since this incorrect key serves as a personal key for the respective processing unit 302, 303, 304, the fact that it is incorrect has the result that the metadata processing by the outer chain is also incorrect and the provided final version of the metadata does not match the reference result of the metadata processing.

To this end, a hash function F is used for the program flow monitoring, which hash function a) makes it possible to detect various errors in the program flow, such as the unintentional omitting, repeating, or rearranging of checkpoints, and b) can be manipulated to the extent that it is possible to therewith provide a predefined result for different data contents (i.e., payload data) in order to be able to specify a (fixed) personal key (Pki) as the result of the metadata processing (if correct) through the inner chain. This specified key Pki for each processing unit 302, 303, 304 is used to ascertain the reference result for the metadata processing of a particular challenge, i.e., for the outer chain processing of the current (outer chain) version of the metadata supplied to the respective processing unit 302, 303, 304 (also referred to as a data processing block).

In this respect, it should be noted that hash function F can be used both for the outer chain program flow monitoring (as explained with reference to FIG. 2) and for the inner chain program flow monitoring. In the inner chain program flow monitoring, the function is, for example, applied to a current (inner chain) version of the metadata at each of several checkpoints in the program code, wherein each checkpoint is assigned a key (PK, i.e., for example, Pki, j for the j-th checkpoint in the i-th processing component) that enters the function F.

In order to satisfy the two aforementioned properties a) and b), a cyclic redundancy check (CRC) function is, for example, used as the hash function F since a CRC function has the following properties:

(1) A CRC calculation of data can be split into individual calculations for portions of the data.

(2) When calculating a CRC value for any data, any CRC result can be forced by appending a specific suffix to the data; the specific suffix can be analytically calculated for each given pair of data and target CRC value.

(3) When the initial key of the CRC function is changed, the resulting CRC value can be purposefully modified to restore the original CRC value.

Property (1) states that a CRC calculation can be stopped and continued if new data are available that are to be included in the calculation. This can be used in the inner chain metadata processing to update the current version of the metadata when a checkpoint is reached in the program code, i.e., for taking into account the key assigned to the checkpoint, e.g., Pki, j). The CRC calculation can thus be split into a plurality of calculations, wherein the resulting CRC value of partial data serves as the starting value for the CRC calculation of the remaining data (+ here denotes the string concatenation):

$$crc(\text{init},\text{data\_1}+\text{data\_2}+\ldots+\text{data\_}K)=crc(\ldots(crc(crc(\text{init},\text{data\_1}),\text{data\_2})\ldots,\text{data\_}K)$$

Property (3) makes it possible to use different challenges MD0 by compensating the difference in the metadata supplied to a processing unit, i.e., for the i-th processing unit, the difference between Mdi-1 (for which Pki results through the inner chain metadata processing) and, due to a changed challenge, other metadata Mdi supplied to the i-th processing unit, at the end of the inner chain metadata processing so that the inner chain metadata processing of Mdi-1 also results in the key Pki assigned to the i-th processing unit. Thus, no change in the key Pki must be taken into account when determining the reference result data.

Property (2) corresponds to the aforementioned requirement b. This property makes it possible to select the resulting Pki of the inner chain metadata processing to be fixed (and, for example, arbitrary) and to assign it to the i-th processing unit, even if the number of checkpoints that are run through in the inner chain payload data processing (and that cause the inner chain metadata processing) varies as a function of the respective payload data (e.g., because a different number of iterations of a loop is carried out). This is achieved by calculating, depending on the payload data supplied to the i-th processing unit, a respective adjustment value (also modification key) with which the result of the inner chain metadata processing is adjusted so that (if the program flow for the inner chain payload data processing was correct and the inner chain metadata processing was thus correct) the key Pki results after the adjustment.

This can take place by calculating a suitable suffix so that Pki results, for example as described in reference 1.

For example, if $$Pki=crc(Mdi,\text{data\_1}+\text{data\_2}+\ldots+\text{data\_}K)$$

where the data_k are the keys of the checkpoints for a particular input to the i-th processing component, an appropriate suffix data_K+1 can be determined such that Pki=crc (Mdi, data'_1+data'_2+ . . . +data'_K'+data'_K'+1) applies if other payload data were supplied to the i-th processing component and a different number of checkpoints (or even partially different checkpoints) have therefore been run through.

For example, the appropriate suffix is determined for each possible number of checkpoints that the program could run through if executed correctly. At the program start of the i-th processing unit, a corresponding function (e.g., a program flow monitoring tool) estimates the expected number of the run-through checkpoints (e.g., as a function of the length of the input payload data, the structure thereof, or possibly also the content thereof). For this expected number of checkpoints, the corresponding suffix is selected and temporarily stored. In so doing, it is assumed for the sake of simplicity that each checkpoint is assigned the same key, which is included in the inner chain metadata processing; if this is not the case, the selection must take place accordingly from a larger set of suffixes, depending on which checkpoints and how often they are run through. However, checkpoints assigned the same key may, for example, be provided in both branches of an if-else instruction so that not too many suffixes are needed. If the inner chain metadata processing has ended, the metadata processing result is adjusted according to the previously temporarily stored suffix (by appending to the input data of the CRC function, for example as data_K+1 as described above). This then results in the predefined personal key (as the adjusted metadata processing result) that was assigned to the processing unit, provided the checkpoints have been run through correctly. The thus resulting result of the metadata processing by the i-th processing unit is used as the key Pki for the i-th processing unit to calculate Mdi=(Mdi—1, Pki).

As described with respect to FIG. 2, after the metadata processing for all processing units, the trusted data sink 305 (trusted with respect to its safety properties) checks the end result of the metadata processing by comparing the end result (response) to a previously calculated reference result. If the response and reference value match, the program flow check provides a positive result, i.e., indicates that no program-flow-related errors were found in the inner chains and in the outer chain.

Figure 4:
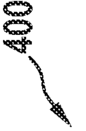
FIG. 4 shows a flow chart representing a method for checking a processing of payload data according to one example embodiment of the present invention.
Figure 4:
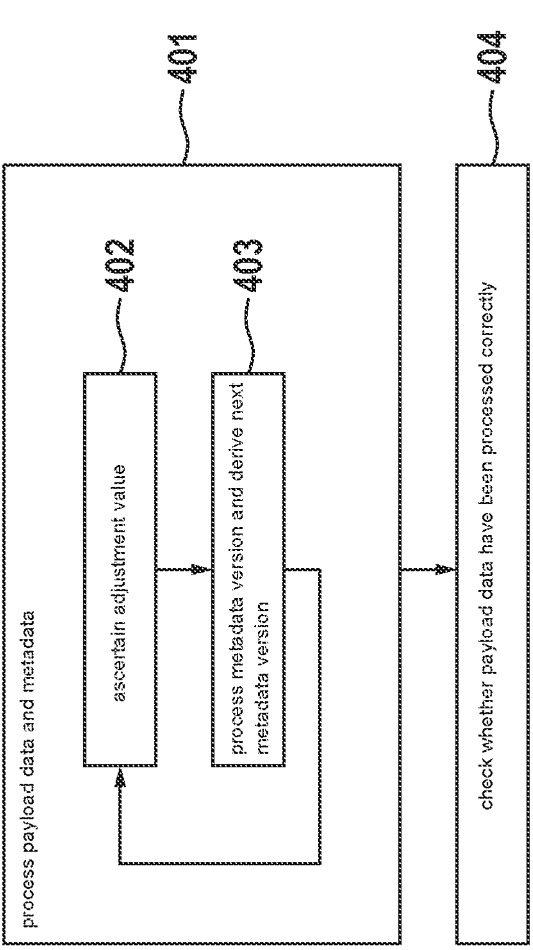

In summary, according to various embodiments, a method as shown in FIG. 4 is provided.

FIG. 4 shows a flow chart 400 of a method for checking a processing of payload data according to one embodiment.

In 401, payload data together with metadata are processed by a sequence of data processing blocks so that the payload data are processed from an initial version of the payload data to a final version of the payload data, and the metadata are processed from an initial version of the metadata to a final version of the metadata. In doing so, in 402, an adjustment value is ascertained for each data processing block as a function of a thereto-supplied payload data version so that, if the thereto-supplied metadata version is correctly processed by the data processing block to form a respective processing result, the processing result, after having been adjusted according to the adjustment value according to a specified adjustment rule, is equal to a value assigned to the data processing block, in 403, each data processing block processes the metadata version supplied to it, and the next metadata version (for supplying to the next data processing block or as the final version of the metadata if the data processing block is the last of the sequence) is derived from the thereto-supplied metadata version as a function of the processing result thereof adjusted according to the adjustment value according to the specified adjustment rule.

402 and 403 are carried out iteratively for each data processing block according to the sequence, i.e., in the order of the data processing blocks in the sequence. In doing so, the payload data are also processed iteratively by the data processing blocks in this order.

In 404, it is checked whether the payload data have been processed correctly by checking whether the final version of the metadata matches a reference final version of the metadata.

The reference final version of the metadata (or also reference result data, reference signature, or reference key) can be ascertained (and stored) in advance (wherein ascertaining may also only consist in the reference result data being received, e.g., from the data source) or can first be ascertained after the metadata result data are received.

The method of FIG. 4 can be carried out by one or more computers comprising one or more data processing units. In particular, each (or at least some) of the data processing blocks can correspond to a data processing unit. The term "data processing unit" can be understood to mean any type of entity that enables the processing of data or signals. The data or signals may, for example, be processed according to at least one (i.e., one or more than one) specific function performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the respective functions described in more detail here can also be understood as a data processing unit or logic circuitry. One or more of the method steps described in detail here can be performed (e.g., implemented) by a data processing unit through one or more specific functions performed by the data processing unit.

The method of FIG. 4 can in particular be applied to a data processing for generating a control signal for a robotic device, e.g., from sensor data recorded by the robotic device. The term "robotic device" can be understood as relating to any technical system (with a mechanical part whose movement is controlled), such as a computer-controlled machine, a vehicle, a household appliance, an electric tool, a manufacturing machine, a personal assistant, or an access control system. A control rule for the technical system is learned, and the technical system is then controlled accordingly.

A corresponding testing protocol can, for example, be included in a respective standard, e.g., a communication standard (such as for V2X communication).

Various embodiments can receive and use sensor signals from various sensors, such as video, radar, LiDAR, ultrasound, movement, thermal imaging, etc., which are processed.

What is claimed is:

1. A method for checking a processing of payload data, comprising the steps including:

processing the payload data together with metadata by a sequence of data processing blocks so that the payload data are processed from an initial version of the payload data to a final version of the payload data, and the metadata are processed from an initial version of the metadata to a final version of the metadata, wherein an adjustment value is ascertained for each data processing block of the sequence of data processing blocks as a function of a supplied payload data version so that, when a supplied metadata version is correctly processed by a data processing block of the sequence of data processing blocks to form a respective processing result, the processing result, after having been adjusted according to the ascertained adjustment value according to a specified adjustment rule, is equal to a value assigned to the data processing block;

wherein each of the data processing blocks of the sequence of data processing blocks processes the supplied metadata version, and a next metadata version is derived from the supplied metadata version as a function of the processing result thereof adjusted according to the adjustment value according to the specified adjustment rule;

wherein each of the data processing blocks of the sequence of data processing blocks processes the supplied metadata version, as a function of checkpoints that are run through during the processing of the payload data, and the adjustment value is ascertained by ascertaining which and/or what number of checkpoints is run through during the processing of the payload data; and checking whether the payload data have been processed correctly by checking whether the final version of the metadata matches a reference final version of the metadata.

2. The method according to claim 1, wherein, for each of the data processing blocks of the sequence of data processing blocks, the next metadata version is derived from the supplied metadata version by applying a function to the supplied metadata version and the processing result after it has been adjusted with the adjustment value according to the specified adjustment rule.

3. The method according to claim 2, wherein the function is a cyclic redundancy check function.

4. The method according to claim 1, wherein the metadata version supplied to each data processing block of the sequence of the data processing blocks is iteratively processed by a data processing block of the sequence of the data processing blocks in that it is processed for each checkpoint that is run through, according to a metadata processing value assigned to the checkpoint.

5. The method according to claim 4, wherein the metadata version supplied to each data processing block of the sequence of data processing blocks is iteratively processed by a data processing block of the sequence of data processing blocks in that it is processed for each checkpoint that is run through, by applying a CRC function which receives, as input, the metadata processing value assigned to the data processing block.

6. The method according to claim 1, wherein the adjustment rule includes that the processing result is adjusted as a function of a difference of the initial version of the metadata to a reference initial version of the metadata.

7. A data processing arrangement for checking a processing of payload data, the data processing arrangement comprising at least one processor configured to:

process the payload data together with metadata by a sequence of data processing blocks so that the payload data are processed from an initial version of the payload data to a final version of the payload data, and the metadata are processed from an initial version of the metadata to a final version of the metadata, wherein an adjustment value is ascertained for each data processing block of the sequence of data processing blocks as a function of a supplied payload data version so that, when a supplied metadata version is correctly processed by a data processing block of the sequence of data processing blocks to form a respective processing result, the processing result, after having been adjusted according to the ascertained adjustment value according to a specified adjustment rule, is equal to a value assigned to the data processing block;

wherein each of the data processing blocks of the sequence of data processing blocks processes the supplied metadata version, and a next metadata version is derived from the supplied metadata version as a function of the processing result thereof adjusted according to the adjustment value according to the specified adjustment rule;

wherein each of the data processing blocks of the sequence of data processing blocks processes the supplied metadata version, as a function of checkpoints that are run through during the processing of the payload data, and the adjustment value is ascertained by ascertaining which and/or what number of checkpoints is run through during the processing of the payload data; and check whether the payload data have been processed correctly by checking whether the final version of the metadata matches a reference final version of the metadata.

8. A non-transitory computer-readable medium on which are stored instructions for checking a processing of payload data, the instructions, when executed by a processor, causing the processor to perform steps including:

processing the payload data together with metadata by a sequence of data processing blocks so that the payload data are processed from an initial version of the payload data to a final version of the payload data, and the metadata are processed from an initial version of the metadata to a final version of the metadata, wherein an adjustment value is ascertained for each data processing block of the sequence of data processing blocks as a function of a supplied payload data version so that, when a supplied metadata version is correctly processed by a data processing block of the sequence of data processing blocks to form a respective processing result, the processing result, after having been adjusted according to the ascertained adjustment value according to a specified adjustment rule, is equal to a value assigned to the data processing block;

wherein each of the data processing blocks of the sequence of data processing blocks processes the supplied metadata version, and a next metadata version is derived from the supplied metadata version as a function of the processing result thereof adjusted according to the adjustment value according to the specified adjustment rule;

wherein each of the data processing blocks of the sequence of data processing blocks processes the supplied metadata version, as a function of checkpoints that are run through during the processing of the payload data, and the adjustment value is ascertained by ascertaining which and/or what number of checkpoints is run through during the processing of the payload data; and checking whether the payload data have been processed correctly by checking whether the final version of the metadata matches a reference final version of the metadata.

* * * * *